United States Patent Office 3,519,544
Patented July 7, 1970

3,519,544
PROCESS FOR THE MANUFACTURE OF OXETANE DERIVATIVES
Carl-Heinrich Krauch, Heidelberg, and Samir Yacoub Farid and Dieter Hess, Mulheim (Ruhr), Germany, assignors to Kalle Aktiengesellschaft, Wiesbaden-Biebrich, Germany, a corporation of Germany
No Drawing. Filed Oct. 12, 1967, Ser. No. 674,762
Claims priority, application Austria, Oct. 17, 1966, A 9,684/66
Int. Cl. B01j 1/10
U.S. Cl. 204—158    5 Claims

ABSTRACT OF THE DISCLOSURE

A process for the manufacture of oxetane derivatives comprises combining vinylene carbonate with a monocarbonyl or 1,2-dicarbonyl compound in an inert solvent and irradiating the combination with light comprising the wavelength corresponding to the initial band of the carbonyl compound, such light, however, being substantially devoid of wavelengths below about 350 mµ when a monocarbonyl is employed and substantially devoid of wavelengths below about 370 mµ when a 1,2-dicarbonyl is employed.

---

It is known that oxetanes are obtained in good yield by photo-initiated reaction between a monocarbonyl compound and an olefin. The formation of these oxetanes may be represented by the following general Equation I:

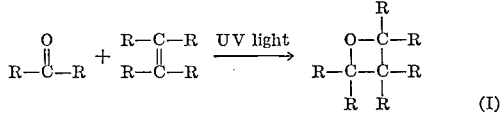

It is also known that photo-reaction between phenanthrenequinone and open-chain olefins leads to the formation of phenanthrodioxenes.

Furthermore, it is known that photo-reaction between phenanthrenequinone-(9,10) and benzocyclic olefins can lead to the formation of α-keto-oxetanes in the case of 1,2-addition on only one carbonyl group, as represented by the following Equation II:

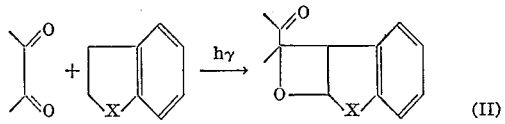

and to the formation of phenanthrodioxenes in the case of 1,4-addition on to both carbonyl groups, as represented by the following Equation III:

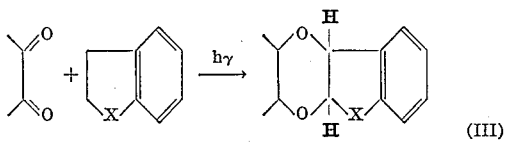

Since it is also known that vinylene carbonate has a strong tendency towards radical copolymerization, it is remarkable that irradiation of maleic anhydride and vinylene carbonate in acetone in the presence of benzophenone produces a crystalline product of the formula

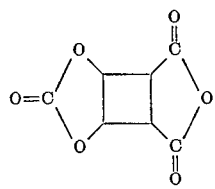

in a smooth reaction (87% yield), and does not lead to the formation of polymeric products.

It is also surprising that the formation of oxetanes by reaction between the vinylene carbonate and acetone or benzophenone does not take place under these conditions. This leads to the assumption that vinylene carbonate occupies a special position in this respect, compared with other vinyl compounds.

The present invention provides a process for the manufacture of oxetane derivatives, wherein a monocarbonyl or 1,2-dicarbonyl compound, the phosphorescent state of which possesses energy not greater than about 70 kcal./mol, is reacted with vinylene carbonate by irradiation with light containing that wavelength range corresponding to the initial bands of the carbonyl compound used, but not those wavelengths that would be absorbed by the end product, namely 370 mµ and below in the case of 1,2-dicarbonyl compounds and 350 mµ and below in the case of monocarbonyl compounds. Thus light from a suitable source may be passed through a filter which is impermeable to light that would be absorbed by the product being formed.

Suitable carbonyl compounds are, for example, the compounds of the general formulae

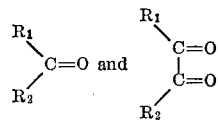

in which the symbols $R_1$ and $R_2$ are the same or different and each represent a hydrogen atom or a substituted or unsubstituted alkyl, cycloalkyl, aryl or heteroyl radical, or, together with the two carbon atoms, form a saturated or unsaturated, substituted or unsubstituted hydrocarbon or hetero ring. As stated, the energy of the phosphorescent state of the carbonyl compound must not exceed 70 kcal./mol. This energy may be assessed from the zero-zero-transition of the phosphorescence spectrum (cf. Textbook by J. G. Calvert and J. N. Pitts, Jr., John Wiley & Sons, Inc., New York, 1966, page 284 ff).

The reaction may be represented, in the case of 1,2-dicarbonyl compounds, by the following Equation IV, the symbols $R_1$ and $R_2$ having the meanings given above:

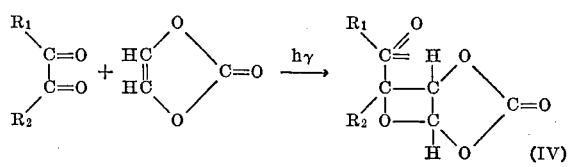

The following are examples of 1,2-dicarbonyl compounds usable as starting materials in the process of the invention:

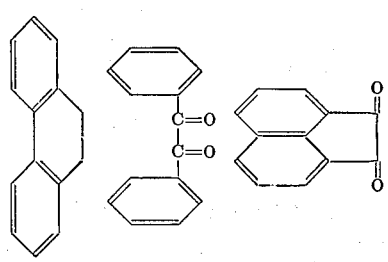

It has already been pointed out that in carrying out the process of the invention the light used must be of a wavelength which is not absorbed by the product being formed. In general, the compounds obtained by the process of the invention are highly sensitive to light of wavelengths below 370 mµ. It is assumed that when they are irradiated with light in the region of 370 mμ and below, they decompose with formation, inter alia, of HCOOH and the corresponding aldehyde. It is possible that in the case of α-keto-oxetanes decomposition proceeds via an intermediate product of the general formula

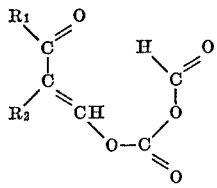

In carrying out the process of the invention, a solution of the components is irradiated in a manner such that only the initial absorption bands of the 1,2-dicarbonyl compound are excited; for example with light above 400 mμ. A solution of the components is irradiated in a manner such that only the 1,2-dicarbonyl compound is excited; for example in the case of phenanthrenequinone-(9,10), acenaphthenequinone and benzil, with light above 400 mμ, and in the case of benzophenone, with light above 350 mμ. Thus, when using the usual kinds of light source, for example, high-pressure mercury burners, high-pressure xenon burners or sunlight, it is necessary to use a filter which blocks the light that would be absorbed by the adduct being formed. A suitable filter, for example, blocks light of a wavelength below 370 mμ. It is of course, possible to use light sources which provide light of the required wavelength, in which case a filter is not needed.

The use of a particular solvent is not absolutely necessary, but it is advantageous to use an aromatic solvent, especially benzene.

The reaction temperature may vary within wide limits and is also not critical. For example, the reaction may be carried out at a temperature within the range of from —80° to +80° C., preferably at a temperature between 0° C. and room temperature.

A quite general procedure for the manufacture of the adduct in accordance with the invention is to introduce vinylene carbonate and the appropriate carbonyl compound into an inert solvent, for example benzene, whereby at least partial dissolution takes place. The batch is then irradiated, while stirring, and the adduct either precipitates or remains in solution. The product obtained by the usual working up processes may be purified by recrystallization, for example from acetone.

It can be seen from the above that the compounds of the invention are formed under the influence of light of long wavelength, and that they decompose when irradiated with light of a wavelength, for example, in the region of and below 370 mμ.

Not only the preparation, but also the use of the compounds prepared by the process of the invention is made possible by the knowledge of this fact. The compounds prepared in accordance with the process of the invention are suitable for use as polymerization catalysts. Because of their special sensitivity to light, they may also be used as initiators in all processes involving light-sensitive layers. It may also be pointed out that the photolysis products, that is to say aldehydes of the grouping

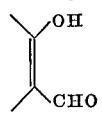

which are formed by irradiation, are ideal components for the Perkin reaction.

The following examples illustrate the invention. In the examples, irradiation is effected by means of a high-pressure mercury burner (emission lines at 334, 366, 405/8, 436 mμ, and above). Analytically pure benzene is used as inert solvent. The irradiation is carried out at a temperature between 15 and 20° C. in an argon atmosphere. Selective excitation of the carbonyl compounds in the case of the 1,2-dicarbonyl compounds is achieved by irradiation through a glass filter impermeable to light of wavelengths below about 370 mμ, and in the case of the monocarbonyl compounds by irradiation through a glass filter impermeable to light above 29,000/cm.

EXAMPLE 1

Photo-addition of phenanthrenequinone to vinylene carbonate 1.04 g. (5 mmols) of phenanthrenequinone and 1.73 g. (20 mmols) of vinylene carbonate are added to 100 ml. of benzene. The reaction mixture is irradiated for two hours while constantly stirring. 1.12 g. of the adduct of phenanthrenequinone and vinylene carbonate precipitate in the form of fine, colorless crystals. After the precipitate has been isolated by filtration, the mother liquor is evaporated and the residue is boiled with 15 ml. of chloroform. A further 60 mg. of the adduct are obtained in this way. A total of 1.18 g. of adduct is obtained, which corresponds to a yield of 80%. The resulting adduct melts (with decomposition) at 242 to 245° C.

Analysis of the product is as follows: $C_{17}H_{10}O_5(294.3)$. Calculated (percent): C, 69.39; H, 3.43. Found (percent): C, 69.10; H, 3.31.

Molecular weight 277 (cryoscopic determination in camphor).

EXAMPLE 2

Photo-addition of acenaphthenequinone to vinylene carbonate 1.82 g. (10 mmols) of acenaphthenequinone and 8.64 g. (100 mmols) of vinylene carbonate are added to 150 ml. of benzene, and the reaction mixture is irradiated for 20 hours while constantly stirring. The solvent is then distilled off and the residue obtained is treated with about 30 ml. of ether. On cooling to —20° C., the almost pure adduct of acenaphthenequinone and vinylene carbonate precipitates in an amount of 1.83 g. (68% yield). After recrystallization from methanol or petrol ether (boiling range: 100 to 140° C.), a product melting at 178 to 181° C. is obtained.

Analysis of the product is as follows: $C_{15}H_8O_5(268.2)$. Calculated (percent): C, 67.17; H, 3.01. Found (percent): C, 67.16; H, 3.05.

Molecular weight 250 (osmometric determination in benzene).

EXAMPLE 3

Photo-addition of benzil to vinylene carbonate

A solution of 2.1 g. (10 mmols) of benzil and 4.32 g. (50 mmols) of vinylene carbonate in 100 ml. of benzene is irradiated for 70 hours while constantly stirring. After working up the reaction mixture in the manner described in Example 2, 1.1 g. (37%) of the adduct of benzil and vinylene carbonate are obtained. After recrystallization from benzene, the adduct has a melting point of 159 to 160° C. The analysis is as follows: $C_{17}H_{12}O_5(296.3)$. Calculated (percent): C, 68.92; H, 4.08. Found (percent): C, 69.46; H, 4.16.

Molecular weight 298 (osmometric determination in benzene).

EXAMPLE 4

Photo-addition of benzophenone to vinylene carbonate 1.82 g. (10 mmols) of benzophenone and 4.32 g. (50 mmols) of vinylene carbonate are dissolved in 150 ml. of benzene and the solution is irradiated for 120 hours while constantly stirring. The solvent is then distilled off and the residue is dissolved in 70 ml. of ether. 30 ml. of petrol ether (boiling range: 50 to 70° C.) are added to the ethereal solution so obtained and the batch is cooled to —20° C. 1.3 g. of the adduct of benzophenone and vinylene carbonate precipitate and the product is isolated by filtration. A further 0.07 g. of the adduct is obtained by further diluting the mother liquor with petrol ether. The total yield thus amounts to 1.37 g. (51%). After recrystallization from methanol, the adduct has a melting point of 117 to 118° C. Analysis is as follows: $C_{16}H_{12}O_4$(268.3). Calculated (percent): C, 71.64; H, 4.51. Found (percent): C, 71.51; H, 4.49.

Molecular weight 277 (osmometric determination in benezene).

It will be obvious to those skilled in the art that many modifications may be made within the scope of the present invention without departing from the spirit thereof, and the invention includes all such modifications.

What is claimed is:

1. A process for the manufacture of oxetane derivatives comprising:
    (a) combining vinylene carbonate with a carbonyl compound selected from the class consisting of monocarbonyl and 1,2-dicarbonyl compounds, the phosphorescent state of which compound possesses energy not greater than about 70 kcal./mol; and
    (b) irradiating said combination with light comprising that wavelength range corresponding to the initial bands of said carbonyl compound, said light being substantially devoid of wavelengths below about 350mµ when said carbonyl compound is a monocarbonyl, and substantially devoid of wavelengths below about 370mµ when said carbonyl compound is a 1,2-dicarbonyl.

2. A process as claimed in claim 1, wherein the carbonyl compound is a compound of the general formula

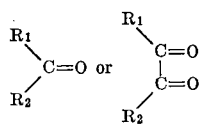

in which the symbols $R_1$ and $R_2$ are the same or different and each represent a hydrogen atom or an alkyl, cycloalkyl, aryl, or heteroyl radical, or, together with the respective carbon atoms, form a hydrocarbon or hetero ring.

3. A process according to claim 1 wherein said irradiating is carried out at a temperature between about −80° C. and +80° C.

4. A process according to claim 1 wherein said vinylene carbonate and carbonyl compound are combined in an inert solvent.

5. A process according to claim 4 wherein said solvent is benezene.

References Cited

UNITED STATES PATENTS 3,346,655  10/1967  Lester _____ 204—158

OTHER REFERENCES

Harris et al.: J.A.C.S., vol. 84 (May 5, 1962) pp. 1553–1555.

HOWARD S. WILLIAMS, Primary Examiner